US012139424B2

(12) United States Patent
Lobato

(10) Patent No.: US 12,139,424 B2
(45) Date of Patent: Nov. 12, 2024

(54) ELECTRO-COALESCER CELL WITH TURBULENCE-INDUCING SHAPE FOR MAXIMIZED PERFORMANCE

(71) Applicant: FMC Technologies, Inc., Houston, TX (US)

(72) Inventor: Arturo Ernesto Menchaca Lobato, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 515 days.

(21) Appl. No.: 17/420,919

(22) PCT Filed: Jan. 3, 2020

(86) PCT No.: PCT/US2020/012180
§ 371 (c)(1),
(2) Date: Jul. 6, 2021

(87) PCT Pub. No.: WO2020/142686
PCT Pub. Date: Jul. 9, 2020

(65) Prior Publication Data
US 2022/0064025 A1 Mar. 3, 2022

Related U.S. Application Data

(60) Provisional application No. 62/788,601, filed on Jan. 4, 2019.

(51) Int. Cl.
C02F 1/46 (2023.01)
B01D 17/06 (2006.01)
(Continued)

(52) U.S. Cl.
CPC ............ *C02F 1/4608* (2013.01); *B01D 17/06* (2013.01); *B01D 53/32* (2013.01); *B03C 3/66* (2013.01); *B03C 2201/02* (2013.01)

(58) Field of Classification Search
CPC ................................. B01D 17/06; C02F 1/463
See application file for complete search history.

(56) References Cited

U.S. PATENT DOCUMENTS 1,754,009 A 4/1930 Cage
3,839,176 A 10/1974 McCoy et al.
(Continued)

FOREIGN PATENT DOCUMENTS

WO 2008066392 A2 6/2008

OTHER PUBLICATIONS

International Search Report issued in International Application No. PCT/US2020/012180 dated Feb. 27, 2020 (4 pages).
(Continued)

*Primary Examiner* — Brian W Cohen
(74) *Attorney, Agent, or Firm* — Osha Bergman Watanabe & Burton LLP

(57) ABSTRACT

The electro-coalescer includes: a fluid inlet; a fluid outlet; a power source; and one or more pipes fluidly connecting the inlet and the outlet, each pipe having an electrode disposed therethrough. The electrodes are coupled to the power source. The pipes are configured to connect to an electrical ground and an electric field is generated between the electrode and the pipe through which it is disposed. An internal surface of each of the one or more pipes is configured to induce turbulence in a fluid flowing through the pipes.

24 Claims, 7 Drawing Sheets

(51) Int. Cl.
*B01D 53/32* (2006.01)
*B03C 3/66* (2006.01)

(56) References Cited

U.S. PATENT DOCUMENTS

| | | | | |
|---|---|---|---|---|
| 3,862,022 | A * | 1/1975 | Hermann | C25B 9/17 |
| | | | | 366/339 |
| 5,861,087 | A * | 1/1999 | Manning | B01D 17/06 |
| | | | | 204/671 |
| 7,166,218 | B2 * | 1/2007 | Trapy | B01D 17/0217 |
| | | | | 204/554 |
| 8,414,777 | B2 * | 4/2013 | Bjorklund | B03C 3/06 |
| | | | | 210/708 |
| 9,751,092 | B2 * | 9/2017 | Tienhaaraa | B01D 17/045 |
| 10,392,568 | B2 * | 8/2019 | Hussain | B03C 5/02 |
| 2004/0144640 | A1 * | 7/2004 | Nilsen | B03C 11/00 |
| | | | | 204/252 |
| 2009/0173684 | A1 | 7/2009 | Tryti et al. | |
| 2011/0031124 | A1 | 2/2011 | Hana | |
| 2011/0253539 | A1 * | 10/2011 | Akdim | B03C 3/08 |
| | | | | 210/708 |
| 2014/0339089 | A1 | 11/2014 | Tienhaaraa et al. | |
| 2016/0193612 | A1 | 7/2016 | Akdim et al. | |

OTHER PUBLICATIONS

Written Opinion issued in International Application No. PCT/US2020/012180 dated Feb. 27, 2020 (6 pages).

* cited by examiner

ELECTRO-COALESCER CELL WITH TURBULENCE-INDUCING SHAPE FOR MAXIMIZED PERFORMANCE

CROSS-REFERENCE TO RELATED APPLICATIONS

This Application claims priority from Application 62/788,601 filed on Jan. 4, 2019 in the United States.

FIELD OF THE DISCLOSURE

Embodiments herein relate generally to the field of electro-coalescers and gravitational coalescers. More particularly, embodiments herein relate to systems providing improved droplet contact/merge propensity, while maintaining ease of manufacture.

BACKGROUND

Phase separation vessels are widely used in the oil and gas industry to divide fluid streams into their constituting phases. This is typically done along a multi-stage process comprising gas/liquid separators, gas/oil/water separators, and oil/water separators. Sand and other solid particles are typically also removed along this process.

The separation of water from a hydrocarbon liquid is an important process in the oil production industry. In an oil-dominated regime, small water droplets can be dispersed in the continuous oil phase due to shearing in upstream piping, for example. Furthermore, both high-pressure applications and enhanced-oil-recovery processes result in highly emulsified hydrocarbon liquids.

The droplet size is an important contributing factor to the speed of the separation. Small droplets of water in oil separate slowly from the oil compared to larger droplets, as Stokes Law shows.

One conventional approach for oil/water separation makes use of gravity and may require large residence times inside separators. This process is complicated by the small density difference between oil and water and the high viscosity of crude oil. Other techniques that use chemicals and/or heating to break the emulsions typically result in high operational costs due to the price of the chemicals and the logistics involved in their supply. Still other techniques that employ heating typically involve high capital expenditure and also result in high operational costs due to their high-energy demand.

The separation of liquids from fluid streams that are primarily gas is also an important industrial process. In many cases, gases with a high economic value are obtained that contain very fine droplets of liquids. Examples include natural gas and many other gases used in the chemical industry, such as chlorine or sulfur dioxide. Also, vapors may partly condense in process, especially in high-gas-speed applications (i.e., the high speeds provide significant force to draw the droplets along), resulting in gas containing fine liquid droplets. Further, any obstacles in the flow path generate high and low pressure areas. Therefore, high gas speeds result in more condensation at obstacles because the pressure differences are much higher.

Since these droplets can corrode piping and are harmful for pumps and other processing equipment, they should be removed before packing or transporting the commercial gas or using the gas in an industrial process. In the petrochemical industry, especially offshore where natural gas is obtained together with salt water and oil, it is beneficial to remove the water and/or other liquids as close to the well as possible. Significant effort is spent drying natural gas with water absorbers to remove water vapor to concentrations far below saturation. However, such efforts may be less efficient if the gas to be dried contains small droplets of liquid, perhaps carried over from upstream processes, in addition to the vapors.

Conventional techniques for removing liquids from gases typically aim at improving the traditional separation of liquids from gases by using gravitation-like forces. One very old technique is based on the observation that a piece of cloth hanging in a fog will collect water from the fog, thus decreasing the fog intensity and providing water. The cloth acts as a condensation center for the droplets and, in the case of water, gravitation will cause excess water to flow down. This technique is the basis for the separation of liquids from gases using wire mesh packages. However, a mesh can become clogged and requires the gas molecules to follow complicated paths through the mesh, costing mechanical energy.

Another technology involves applying rotational motion onto the fluid in order to produce a centrifugal force with a magnitude several times greater than that produced by gravity. In this manner, the separation proceeds at a rate many times faster than under gravitation alone, resulting in a much smaller apparatus. Yet, increasing gravitational forces by spinning requires mechanical energy that is generally drawn from the gas to be separated. This consumed mechanical energy results in a pressure drop, which increases the required number or size of the pumps. Common examples of these type of apparatuses are cyclones and centrifuges.

To improve the efficiency of gas/oil/water and oil/water separation methods such as those described above, an electro-coalescer device is often used to facilitate the separation of, for instance, water droplets dispersed in the oil phase. Electro-coalescer devices achieve water droplet enlargement by coalescence, whereupon the water can be separated more easily.

An electro-coalescer device can be employed to speed up the separation of any emulsion where the continuous phase is an electrical insulator, such as oil, and the dispersed phase has a different permittivity than said continuous phase. The dispersed phase may, for instance, be an electrical conductor such as water. In an electrostatic coalescing device, an emulsion may be subjected to an alternating-current electric field or to a continuous or pulsed direct-current electric field.

Unfortunately, conventional electro-coalescers may be too expensive or physically impractical to deploy in locations such as subsea, Arctic, remote, marginal, or off-shore locations.

SUMMARY

Embodiments herein are directed towards electro-coalescers that utilize both turbulence and electro-coalescence to overcome the above-noted disadvantages of the prior art. Moreover, the construction described herein is very simple, robust, and cost-effective for constructions intended for commercial applications.

In one aspect, embodiments herein are directed toward an electro-coalescer. The electro-coalescer may include: a fluid inlet; a fluid outlet; a power source; and one or more pipes fluidly connecting the inlet and the outlet. Each pipe may have an electrode disposed therethrough, and the electrodes may be coupled to the power source. The pipes may be configured to connect to an electrical ground, whereby an electric field is generated between the electrode and the pipe through which it is disposed. An internal surface of each of the one or more pipes is configured to induce turbulence in a fluid flowing through the pipes.

The power source may be a direct current power source. In various embodiments, the direct current power source may supply a direct current that is optionally continuous or pulsed.

The electro-coalescer may also include a controller. The controller may include an inductor coupled in parallel with the electrodes. The inductor and electrodes may define a resonant circuit. The controller may also include a signal generator coupled to the power source and the electrodes and may be operable to apply an alternating current signal to the electrodes at a frequency corresponding to a resonant frequency of the resonant circuit in the presence of the fluid.

In some embodiments, the pipes may have a length to internal diameter ratio of up to about 50:1.

In one or more embodiments, at least one of the electrodes may be selectively turned off, such that a continuous phase may be allowed passage through the corresponding fluid pipe.

The multiple pipes may be surrounded by a casing, and between or supporting the multiple pipes may be one or more tubesheets.

The electrodes may consist of a conductor surrounded by an electrically insulating sleeve.

The electrodes may be made of an electrically conductive material, and the pipes may be made of an electrically conductive material. In some embodiments, the electrodes optionally take the shape of a rod or a tube.

The electrodes may be in contact with the fluid and not in electrical contact with the pipe. In some embodiments, the electrodes are substantially straight.

While the pipes are configured to induce turbulence, the pipe(s) may have a straight bore through which the electrodes may be disposed to allow for simplified fabrication.

In another aspect, embodiments herein are directed toward a method of separating two fluid phases. The method may include: providing a flow of a process fluid comprising two or more phases, including a dominant phase and a dispersed phase, to an electro-coalescer as described above. The method may also include electrically grounding the one or more pipe(s), applying a voltage to one or more of the electrode(s) of the electro-coalescer, and generating an electric field between the electrode(s) and the pipe(s). Passing the process fluid through the electric field may generate an electric field that induces electrocoalescence of droplets of the dispersed phase within the process fluid. Further, the internal surface of the pipe(s) may induce turbulence and increases an interaction frequency between droplets of the dispersed phase. The droplets of the dispersed phase may coalesce and allow recovery of a larger-droplet fluid, wherein an average droplet size of the dispersed phase at the outlet is increased as compared to an average droplet size of the dispersed phase at the inlet.

In some embodiments, the method may include generating the electric field using a direct current signal applied to the electrode(s). The direct current signal may optionally be continuous or pulsed.

The method may also include providing an inductor coupled in parallel with the electrode(s). The inductor, the electrode(s), the pipe(s), and the process fluid may define a resonant circuit. The method may also include applying an alternating current signal to the electrode(s) at a frequency corresponding to a resonant frequency of the resonant circuit in the presence of the process fluid.

Applying the alternating current signal may include: sensing a current of the alternating current signal; and changing the frequency to minimize the sensed current.

The turbulence induced by the internal surface of the pipe(s) may be sufficiently high to contribute to an increase in the average droplet size of the dispersed phase without causing significant redispersion of the dispersed phase. For example, the average droplet size of the dispersed phase at the outlet may be at least 50% larger than the average droplet size of the dispersed phase at the inlet.

In some embodiments, the dominant phase is an oil and the dispersed phase is an aqueous phase that can optionally contain dissolved salts.

In other embodiments, the dispersed phase is an oil and the dominant phase is an aqueous phase that can optionally contain dissolved salts.

The method may further include feeding the larger-droplet fluid recovered from the outlet of the electro-coalescer into a fluids separator located downstream of the electro-coalescer for performing fluids separation on the larger-droplet fluid to separate the dispersed phase and the dominant phase. The dispersed phase may then be discharged via a dispersed phase outlet and the dominant phase may be discharged via a dominant phase outlet.

The method may also include feeding an inlet fluid into a solids separator that is upstream of the electro-coalescer, such as for performing solids separation on the inlet fluid to separate solids, creating a reduced-solid fluid. The solids may then be discharged via a solids outlet and the reduced-solid fluid may be recovered via an outlet of the solids separator and fed into the inlet of the electro-coalescer.

The method may also include feeding an inlet fluid into a flash evaporator that is upstream of the electro-coalescer for performing flash evaporation on the inlet fluid to separate a gas, creating a reduced-gas fluid. The gas may be discharged via a gas outlet and the reduced-gas fluid may be recovered via an outlet of the flash evaporator and fed into the inlet of the electro-coalescer.

In another aspect, embodiments herein may be directed toward a method for separating a dispersed phase from a dominant phase in a fluid, such as a fluid containing oil and an aqueous phase. The method may include: supplying the inlet fluid to a flash evaporator and/or a solids separator to produce a fluid with reduced gas and/or reduced solids. The inlet fluid or a reduced-solid fluid may be fed, for example, into the flash evaporator, performing flash evaporation to separate natural gas from the reduced-solid fluid or the inlet fluid, discharging the natural gas via a gas outlet, and creating a reduced-gas fluid that is output via an outlet of the flash evaporator. Alternatively, the method may include feeding the inlet fluid or the reduced-gas fluid into the solids separator, performing solids separation to separate solids from the reduced-gas fluid or the inlet fluid, discharging the solids via a solids outlet, and creating the reduced-solid fluid that is output via an outlet of the solids separator. The reduced-gas and/or reduced-solid fluid may then be fed to an electro-coalescer for performing electrocoalescence to increase average droplet size of the dispersed phase in the dominant phase in the reduced-gas and/or the reduced-solid fluid, creating a larger-droplet fluid that is output via an outlet of the electro-coalescer. The larger-droplet fluid may then be fed into a fluids separator, for performing fluids separation on the larger-droplet fluid to separate the aqueous phase and the oil, and separately discharging the aqueous phase via a water outlet and the oil via an oil outlet.

In yet another aspect, embodiments herein are directed toward a separation system for separating one or more dispersed phases from a dominant phase in an inlet fluid. The system may include: a flash evaporator that separates a gas from the inlet fluid and/or a reduced-solid fluid, creates a reduced-gas fluid, discharges the gas via a gas outlet, and outputs the reduced-gas fluid via an outlet of the flash evaporator. The system may also or alternatively include a solids separator that separates solids from the inlet fluid and/or the reduced-gas fluid, creates the reduced-solid fluid, discharges the solids via a solids outlet, and discharges a reduced-gas and/or reduced-solids fluid via an outlet of the solids separator. Further, the system includes an electro-coalescer that performs electrocoalescence to increase average droplet size of the dispersed phases in the dominant phase within the reduced-gas and/or reduced-solids fluid producing a larger-droplet fluid, and outputs the larger-droplet fluid via an outlet of the electro-coalescer; and a fluids separator that separates the larger-droplet fluid into the dispersed phases and the dominant phase, and separately discharges the dispersed phases via one or more dispersed phase outlets and the dominant phase via a dominant phase outlet.

Other aspects and advantages of the invention will be apparent from the following description and the appended claims.

DETAILED DESCRIPTION

Figure 1:
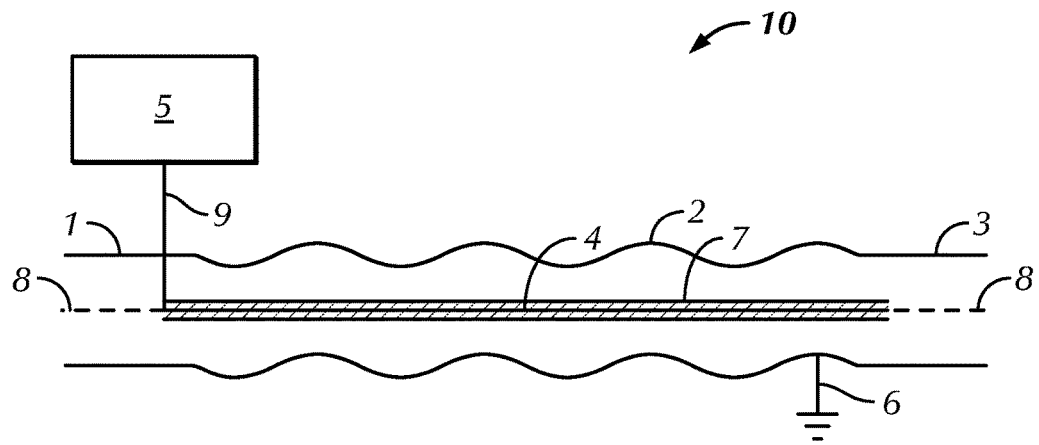
FIG. 1 is a simplified longitudinal view of an electro-coalescer with a single pipe in accordance with one or more illustrative embodiments of the present subject matter.

Embodiments herein are directed toward the treatment of a process fluid, such as a fluid comprising a dominant phase and a tight emulsion of at least a second, undesirable phase termed the dispersed phase. There may be multiple dispersed phases. Treatment of the process fluid may be performed in an electro-coalescer according to embodiments herein. After treatment, in one or more embodiments, downstream the fluid may have the same overall composition, but the droplets of the dispersed phase(s) may have coalesced into larger droplets. These larger droplets are much easier to separate via conventional fluids separation methods. In one or more embodiments, the overall process fluid may have the same composition downstream, but some fraction of the dispersed phase may separate, leaving behind a dominant phase with a decreased amount of the dispersed phase that may also have coalesced into larger droplets.

The electro-coalescer may be applied to any fluid system where the specific resistance of the dominant phase is larger than about $10^7$ Ohm*m and where the electric permeability of the dominant phase and the dispersed phase(s) are different. For example, the size of water droplets in hydrocarbon gas streams may be enlarged by the electro-coalescer to more efficiently dry the gas.

Electro-coalescer systems according to embodiments herein may be a stand-alone unit operation, receiving a feed from upstream and discharging a coalesced product stream for further processing downstream, such as in a gravity settler. In other embodiments, electro-coalescer systems according to embodiments herein may be integral with a gravity settler, such as described in WO2018153491 (FMC Separation Systems By).

A common feature of the prior art vessel-based and straight-bore electro-coalescer separators is that the fluid is typically electrostatically treated at relatively low flow velocities. Since the electrostatic force between droplets is very short range, decreasing the distance between droplets improves the efficiency of the coalescence process. Therefore, at low flux, a vessel-based and straight-bore electro-coalescer has a reduced collision rate between water droplets, leading to an overall reduction in the droplet-droplet coalescence rate. Also, low flow velocity in a vessel-based or straight-bore electro-coalescer increases the probability of either secondary droplet formation (i.e. partial re-emulsification) or water droplet chain formation.

One way to increase interactions between droplets at a given flow velocity is through mixing via, for instance, intentional turbulence. Increasing the turbulence, and therefore decreasing the time between collisions of droplets, is particularly important as the fractional volume of the dispersed phase decreases.

The Reynolds number can be used to help predict the flow patterns in a particular situation. A low Reynolds number typically indicates laminar flow, which has low turbulence and little mixing. This lack of mixing decreases the collision rate between water droplets, increasing the time required for coalescence. A high Reynolds number typically indicates turbulent flow, which corresponds with rapid mixing. If the flow is too turbulent, rapid mixing can actually cause re-emulsification of the dispersed phase in the dominant phase. Between those two regimes is transitional flow. Transitional flow has a moderate amount of turbulence, which increases the rate of collisions without causing re-emulsification. Half of the variables for the calculation of the Reynolds number are dictated by the process fluid involved (density and viscosity), and therefore cannot be changed for a given industrial process. The two factors that can be adjusted via apparatus design are the velocity of the fluid and the characteristic linear dimension. While the fluid flow of a real system is chaotic and has many more than four factors, the Reynolds number provides some insight into creating a device that enhances mixing without causing re-emulsification of the dispersed phases.

FIG. 1 is a simplified cross-section view of an electro-coalescer 10 with a single pipe 2 in accordance with one or more illustrative embodiments of the present subject matter. An electro-coalescer 10 with a single pipe 2 may have a few major components in one or more embodiments. The influent may flow in the inlet 1. It then may flow into the pipe 2, which may be undulating as depicted in this illustrative example. After flowing through the pipe 2, the effluent may flow out the outlet 3. While in the pipe 2, the fluid may also undergo electro-coalescence. For electro-coalescence to occur, the fluid must encounter an electric field. To this end, an electrode 4 may be disposed through the pipe 2. In one or more embodiments, the electrode 4 may be formed of a conductive material such as a high-voltage wire, rod, or tube. The electrode 4 may be connected to a power source 5. The electrode 4 may be connected to a connecting device 9 that electrically connects the electrode 4 to the power source 5. Finally, the pipe 2 may be connected to an electrical ground 6.

When the electro-coalescer 10 is activated, current may run through the electrode 4. Since the pipe 2 depicted here is made of a conductive material and is connected to an electrical ground 6, an electric field can form in the space between the electrode 4 and the interior of the pipe 2 through which the fluid flows.

In one or more embodiments, the electrode 4 may be surrounded by a sleeve 7, that is optionally a coating. Generally, the sleeve 7 may help protect the electrode 4 from erosive or corrosive effects of the process fluid (e.g., due to particles or chemicals in the process fluid) and may also serve as an electrical insulator to reduce the likelihood of short-circuiting between the electrode 4 and pipe 2. Exemplary materials for the sleeve 7 include epoxy, electrically non-conducting ceramics, plastic coatings, etc. formed using processes such as molding, chemical vapor deposition, physical vapor deposition sintering, etc. Making the sleeve 7 of an electrically insulating material prevents short-circuiting the system via the fluid.

Alternatively, electrically insulating layers may be combined with other protective layers on the outside surfaces to meet the mechanical requirements of the application (e.g., abrasion resistance or corrosion resistance). For example, an insulating epoxy coating may be covered by a ceramic coating. The particular insulator and/or abrasion resistant coating selected for the sleeve 7 may vary depending on mechanical requirements, cost, and material electrical properties (e.g., dielectric constant).

One or more embodiments of the electrode 4 may be rod-shaped and may be made of an electrically conductive material. In other embodiments, an electrode having a non-circular cross-section may also be used.

One or more embodiments of the electrode 4 may be tube-shaped and may be made of an electrically conductive material.

In one or more embodiments, the electrode 4 may be surrounded by a sleeve 7 made of chemically inert material to protect it from the process fluid.

In one or more embodiments, the electrode 4 may be partially or fully surrounded by a sleeve 7 made of an electrically insulating material.

One or more embodiments include an electrode 4 that may be largely straight. The rod may be disposed, for instance, along a longitudinal axis 8 of a pipe 2.

Figure 2A:
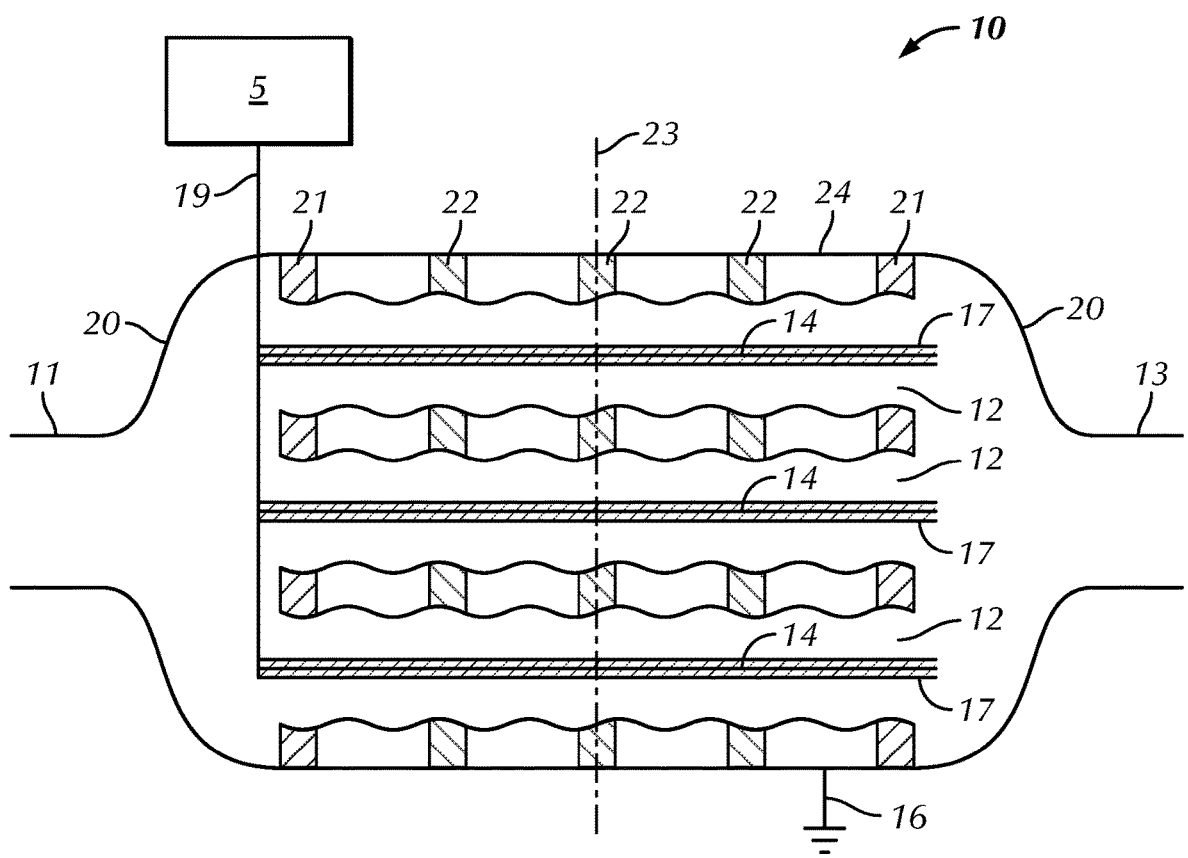
FIG. 2A is a simplified longitudinal view and FIG. 2B is a simplified cross-sectional view of an electro-coalescer with multiple pipes in accordance with one or more alternative illustrative embodiments of the present subject matter.

FIG. 2A is a simplified longitudinal view of an electro-coalescer 10 with multiple pipes 12 in accordance with one or more illustrative embodiments of the present subject matter.

An electro-coalescer 10 with more than one pipe 2 such that they become a collection of multiple pipes 12, may have a few major components as in these one or more embodiments. Attached to the inlet 11 may be a head 20, which distributes the feed via a distributor 21 to multiple pipes 12. The multiple pipes 12 may be undulating as depicted in this illustrative example (FIG. 2A). Attached to the end of the multiple pipes 12 may be a second distributor 21 that will collect the flow from each of the pipe 12. A second head 20 may then capture all of the flow and may direct the coalesced fluid to the outlet 13. The multiple pipes 12 may be contained in a larger casing 24 and may be held in place with one or more tubesheets 22.

The fluid may follow this flow path: The influent may flow in the inlet 11. Next, the fluid may reach a head 20 and distributor 21, which may route the fluid into the multiple pipes 12. After flowing through the pipes 12, the fluid may flow out past a second distributor 21 where the fluid collects in a second head 20 and flows out the outlet 13.

In one or more embodiments, all of the pipes 12 may be surrounded by a casing 24. This casing 24 may provide structural support, protect the pipes, or serve another purpose.

Additionally, in one or more embodiments, there may be one or more tubesheets 22. The one or more tubesheets 22 may provide additional structural support at points along the length of the many pipes 12 and may stabilize the pipes 12 within the casing 24. In such a system, the pipes 12 may be in physical and/or electrical contact. Tubesheet(s) 22 may electrically connect the pipes 12 to the casing 24 and therefore to ground 16. The tubesheet(s) 22 may be attached (perhaps by welding) to the casing 24.

In one or more embodiments, the ends of the tubes 12 may be disposed and attached (perhaps by welding) to one or more distributors 21. In one or more embodiments, there may be two distributors 21: one at the inlet-end of the pipes 12 and one at the outlet-end of the pipes 12. The distributor(s) 21 may also be attached to the casing 24 (perhaps by welding) to ensure good contact and structural stability. This disposal of distributor(s) 21 may prevent fluid from flowing around the pipes 12, instead routing the fluid through the pipes 12. This configuration may also serve to provide electrical connection and/or physical stability to the pipes 12 within the casing 24.

In one or more embodiments, there may be two distributors 21 and no tubesheets 22. This configuration may occur when the pipes 12 are shorter. In an alternative one or more embodiments, there may be two distributors 21 and one or more tubesheets 22. This configuration may occur when the pipes 12 are longer.

Each electrode 14 may be disposed within a respective pipe 12, and may be located along a longitudinal axis 8 of each undulating pipe 12. The electrodes 14 may be held in place within each pipe 12 via a conductive or insulating spacer or other means, disposed within the heads 20 or pipes 12, while not hampering or restricting flow of the fluid through the electro-coalescer 10. Both the induced turbulence caused by the shape of the pipe 12 and the electric field between the pipe 12 and electrode 14 serve to apply radial forces on the electrode 14. Therefore, the spacers/rod sheets/electrode holders must impart a degree of stability to the electrodes 14, so as to maintain an adequate distance between each electrode 14 and pipe 12.

FIGS. 1 and 2A are drawn with horizontal pipe(s) 2, 12 and electrode(s) 4, 14 merely for convenience. The electro-coalescer 10 of this disclosure, with either one or many pipes 2, 12 could, alternatively, be disposed vertically or inclined at an arbitrary angle. In a vertical or inclined electro-coalescer 10, either the inlet 1, 11 or the outlet 3, 13 may be disposed upward, meaning the process fluid can flow either up or down.

While in the pipes 12, the fluid may undergo electro-coalescence. An electrode 14 may be disposed through each pipe 12. In one or more embodiments, the electrode 14 may be formed of a conductive material such as a wire or rod. Each of the electrodes 14 are connected to the power source 15. The electrodes 14 may each be connected to a connecting device 19 that electrically connects the electrodes 14 to the power source 15. Finally, the pipes 12 may be connected to an electrical ground 16. In one or more embodiments, the casing 24 and the tubesheet(s) 22/distributor(s) 21 are made of an electrically conductive material such as a metal. Therefore, by connecting the casing 24 to a ground 16, all of the pipes 12 are grounded via contact with the tubesheet(s) 22 and/or distributor(s) 21. Alternatively, the pipes 12 may each individually be connected to ground 16 via an electrical connection such as a wire (not depicted).

When the electro-coalescer 10 is activated, current may run through one or more of the electrodes 14. Since the pipes 12 may be made of a conductive material and may be connected to an electrical ground 16, an electric field may form between the electrified electrodes 14 and the interior of the pipes 12. This electric field may flow through the fluid.

In one or more embodiments, one or more electrodes 14 may be surrounded by a sleeve 17, that is optionally a coating. Generally, the sleeve 17 may help protect the electrode 14 from erosive or corrosive effects of the process fluid.

In one or more embodiments, the sleeve 17 around one or more electrodes 14 may serve as an electrical insulator to reduce the likelihood of short-circuiting between an electrode 14 and the pipe 12 through which it may be disposed. In general, the system only works and electro-coalescence only takes place when there is an electric field created between the electrodes 14 and the pipes 12, provided no electric current flow (flow of electrons) occurs between those two elements. There is generally no current flow between these two elements when one or more of the following situations is satisfied: the electrode 14 is electrically insulated by the sleeve 7; the conductivity of the emulsion is low; the volume of the dispersed phase is small enough; the applied voltage is low enough so as not to form water-droplet-chains between the electrode 14 and the pipe 12; and/or, the turbulence is high enough as to prevent the formation of water-droplet-chains between the electrode 14 and the pipe 12.

In one or more embodiments, the electrically insulating sleeve 17 around one or more electrodes 14 is not disposed along the entire length of the electrode 14. In such a case, there may be different regions of the sleeve 17: some regions are electrically insulating, while others only serve to protect the electrode 14 from the process fluid. One or more embodiments may have the region of an electrode 14 exposed to a higher concentration of the dispersed phase (upstream) disposed with an insulating sleeve 17. The region of the electrode 14 exposed to a lower concentration of the dispersed phase (downstream), in one or more embodiments, may not have an electrically insulating sleeve 17. This may increase the electric field in that region, which may be necessary to obtain reasonable coalescence efficiency for a fluid with a lower concentration of the dispersed phase. Alternative combinations of insulated sleeve-covered, non-insulated sleeve-covered, and/or unsleeved lengths of the electrode 14 are also possible.

One or more embodiments of the method for separating two fluid phase comprises providing a flow of a fluid that consists of two or more phases as described above. This fluid enters via an inlet 1, 11 and goes through an electro-coalescer 10 as described above. The pipes 2, 12 of the electro-coalescer 10 are made from a conductive material and are electrically grounded via connection to a ground 6, 16. An electrode 4, 14 of the electro-coalescer 10 is disposed through a pipe 2, 12 and connected to a power source 5, 15. Together, when voltage is applied, an electric field forms between the electrode 4, 14 and the pipe 2, 12 and flows through the fluid. Finally, the fluid exits via an outlet 3, 13 and is recovered. The electric field induces electro-coalescence of the droplets of the dispersed phase within the fluid. Also, the internal surface of the pipes 2, 12 are structured to induce turbulence, which increases the interaction frequency between the droplets of the dispersed phase. Together, the electro-coalescence and the turbulence cause the droplets to rapidly aggregate (coalesce) to form larger droplets. The final fluid has an average droplet size of the dispersed phase at the outlet 3, 13 that is increased as compared to an average droplet size of the dispersed phase at the inlet 1, 11.

The goal of electro-coalescence is to increase the average droplet size of the dispersed phase within the dominant phase while minimizing or preventing secondary droplet formation. In one or more embodiments, the average droplet size of the dispersed phase at the outlet 3, 13 of an electro-coalescer 10 may be at least 50% larger than the average droplet size of the dispersed phase at the inlet 1, 11.

Alternative static mixer designs seen in the prior art increase turbulence by placing features in the path of the fluid, but these alternative designs have a number of design complications. In one or more embodiments, when the turbulence-causing features are in electrical contact with both the grounded pipe wall and the electrode, they cannot be an electrical conductor; otherwise, the electric field in the fluid volume will vanish in a vast zone around such features. If those features cover a large part of the electrode, the electric field will vanish throughout the complete cell volume, and power consumption will greatly increase. Additionally, if such features present sharp edges, their presence will locally increase the electric stress in the insulating sleeve of the electrode, potentially leading to premature material failure. For those reasons, when the turbulence-causing features are in electrical contact with both the grounded pipe wall and the electrode, they must be made of a suitable dielectric material. Such material must be suitable for operation at high voltage combined with high frequency, high pressure (providing good sealing), and high temperature, while being chemically resistant to the process fluid, formable into the required shape, sufficiently hard and tough, long-lasting, not prone to damage by rapid decompression, and preferably with a coefficient of thermal expansion similar to the other materials used in the cell, among other requirements. The resulting parts must be simple and inexpensive to produce, install. and service, and must not pose increased probability of fouling or clogging the electro-coalescer cell during service. To our knowledge, no polymeric material exists that meets these requirements. The only dielectric materials that can meet the majority of these requirements are glasses and ceramics. But making, installing, operating, and servicing turbulence-inducing features made of either glass or ceramic would pose a great technical challenge, and would result in a complex and expensive solution, a solution that would fail to meet all of the above-mentioned requirements.

Instead, in one or more embodiments, the structure of the interior walls of the pipes 12 may be configured so the fluid flowing through them is in a mildly turbulent, transitional flow regime, but the electrodes 14 are largely straight. The particular geometry of the electro-coalescer pipes 12 may result from designing the turbulence and velocity of the electro-coalescer 10 for a particular fluid. To this end, each pipe 12 and electrode 14 may take a variety of shapes and arrangements in both the cross-sectional and longitudinal dimensions.

The particular geometry of the electrodes 14 and pipes 12 (e.g., arrangement, number, thickness, cross-section, electrode 14 placement, etc.) may vary depending on factors associated with the particular implementation, such as process fluid, incoming piping diameter, fluid pressure, expected flow rate, etc. For example, the shape and internal diameter of the pipes 12 may vary depending on the processed fluid.

In one or more embodiments the inlet 11 and/or the outlet 13 may be disposed transverse to the main axis of the casing 24, or at any other angle relative to the main axis of the casing 24.

Figure 2B:
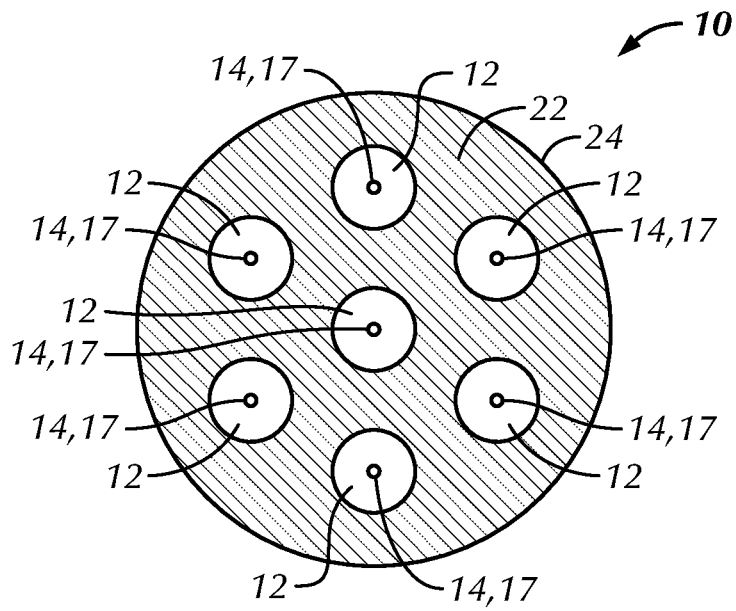

FIG. 2B is a simplified cross-sectional view of the same electro-coalescer 10 with multiple pipes 12. This image is a cross-section of the electro-coalescer 10 depicted in FIG. 2A along a dotted line 23 through the middle tubesheet 22. In this example, the casing 24 encompasses seven pipes 12 that are being held in place by a tubesheet 22. Disposed through each of the pipes 12 may be an electrode 14 that may be surrounded by a sleeve 17. Note, in FIG. 2B, the electrode 14 and sleeve 17 are depicted as a single object, for simplicity, when the sleeve 17 surrounds the electrode 14 as described above.

One or more embodiments of the electro-coalescer 10 may have multiple electrodes 14. In some embodiments, there is a single electrode 14 disposed through each pipe 12. In other embodiments, some pipes 12 may not have an electrode 14 disposed through.

Each pipe 12 may surround at least part of a corresponding rod-shaped electrode 14. In one or more embodiments, the electrode 14 may extend past one end of the pipe 12 into one of the heads 20, either towards the inlet 11 or towards the outlet 13. In some embodiments, the electrode 14 may extend past both ends of the pipe 12 towards both the inlet 11 and the outlet 13. In other embodiments, at one or both ends, the electrode 14 may end approximately even with the pipe 12. In one or more embodiments, either or both ends of the electrode 14 may end wholly within the pipe 12.

In one or more embodiments, the pipes 12 are in contact. The contact could be along their entire length or only at a limited number of points. The pipes 12 that may have a round cross section and may be in contact. The pipes 12 may be close-packed, square-packed, or placed in any other packing arrangement. The packing may or may not be optimal. Optimal packing is defined as having the maximum number of tubes for a given casing 24 interior shape.

In one or more embodiments, the cross-section of the pipes 12 may be a tessellating shape such as a perfect hexagon or a rectangle. The pipes 12 may be arranged in a tessellated fashion within the casing 24. Therefore, in one or more embodiments where the pipe 12 cross-sections may be a perfect hexagon, a collection of pipes 12 may resemble a honeycomb, where a wall may be common between two or more pipes 12.

Figure 3A:
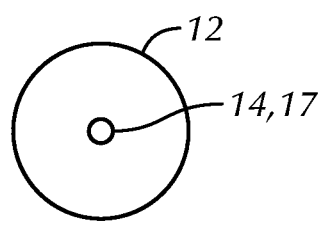
FIGS. 3A-D are cross-sectional views of pipes with various cross-sectional geometries that may be employed in the electro-coalescer of FIGS. 1 and 2.

FIG. 3A is a cross-sectional view of a pipe 12 with a circular cross-section where the electrode 14 and sleeve 17 are disposed through the center of the circular pipe 12. In one or more embodiments, the cross-section of an interior of the pipe 12 may have curved sides.

In one or more embodiments, the cross-section of an interior shape of the pipe 12 may be round and, therefore, may be oval, elliptical, or circular.

Figure 3B:
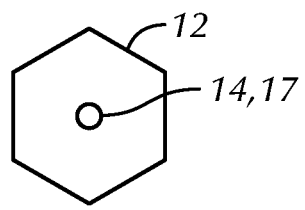

FIG. 3B is a cross-sectional view of a pipe 12 with a regular hexagonal cross-section, where the electrode 14 and sleeve 17 are disposed through the center of the hexagonal pipe 12. In one or more embodiments, the cross-section of an interior of the pipe 12 may have straight sides.

In one or more embodiments, the cross-section of an interior of the pipe 12 may be a regular polygon. In one or more embodiments, the cross-section of an interior of the pipe 12 may be an irregular polygon.

Figure 3C:
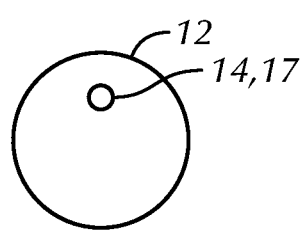

FIG. 3C is a cross-sectional view of a pipe 12 with a circular cross-section, where the electrode 14 and sleeve 17 are not disposed through the center of the pipe 12 but are instead disposed through the pipe 12 at a location offset from the center. In one or more embodiments, the electrode 14 may be disposed through the pipe 12 at a location that is not the geometric center.

In one or more embodiments, an electrode 14 may be disposed through the center of a pipe 12. Alternatively, in one or more embodiments, an electrode 14 may be disposed through a pipe 12 at a location offset from the center. Within a single electro-coalescer 10, different pipes 12 may have electrodes 14 disposed at different locations. Within a single pipe 12, an electrode 14 may be disposed at different locations along the length of the pipe 12. For example, the electrode 14 may be disposed at the geometric center toward the inlet 11, and offset from the geometric center toward the outlet 13.

Figure 3D:
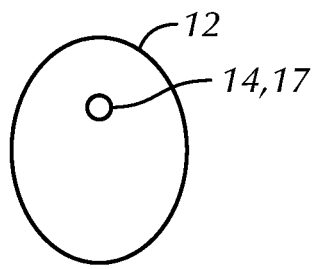

FIG. 3D is a cross-sectional view of a pipe 12 with an elliptical cross-section, where the electrode 14 and sleeve 17 are disposed through the pipe 12 at a point offset along the semi-major axis of an ellipse. In one or more embodiments, the electrode 14 may be disposed through an elliptical pipe 12 at a location that may be offset along the semi-major or semi-minor axis of the ellipse.

The cross-section of an interior of a pipe 12 may take a shape that is not a regular polygon, a perfect circle, or a perfect ellipse.

The cross-section of the interior of a single pipe 12 may not be consistent along the length of the pipe 12. For example, the cross-section of the portion of a pipe 12 closer to the inlet 11 may be circular and the portion of the pipe 12 closer to the outlet 13 may be hexagonal.

The interior of each pipe 12 may not be uniform among the many pipes 12 within a single electro-coalescer 10. For example, one or more embodiments of the electro-coalescer 10 may have half circular pipes 12 and half hexagonal pipes 12.

Figure 4A:
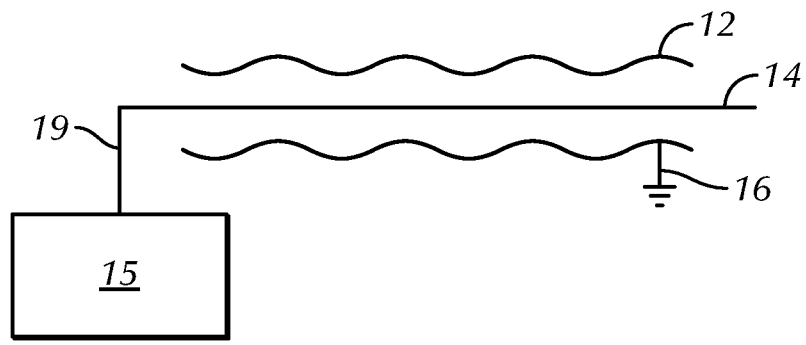
FIGS. 4A-D are various longitudinal views of pipes with various longitudinal geometries that may be employed in the electro-coalescer of FIGS. 1 and 2.
Figure 4B:
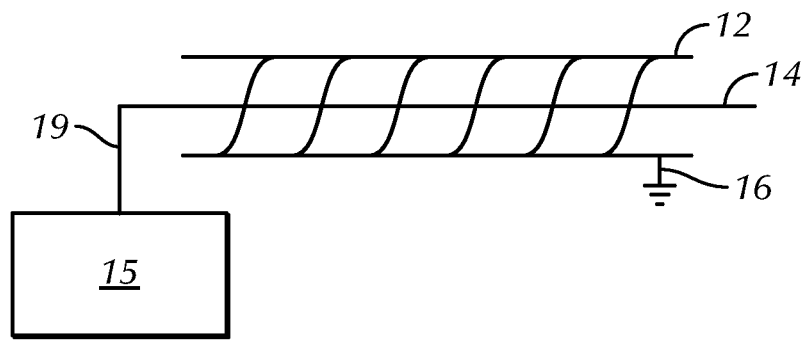

In one or more embodiments, the interior of the pipe 12 may take the shape of a twist. Here, a twist is the shape of a pipe 12 that has been rotationally deformed around the axis of the pipe 12 as if it had undergone torsion. In a twist, the central axis of the pipe 12 may be retained, and the electrode 14 may be disposed through this central axis. A twist is not the same as a helix, where the pipe 12 is bent around a new central axis that is outside of the pipe 12. FIG. 4B depicts a longitudinal view of a pipe 12 with a twist structure, one of the possible pipe 12 structures used to increase turbulence. As in these one or more embodiments, the electrode 14 may be disposed through the center of the pipe 12 and may be connected to a power source 15. Additionally, the pipe 12 may be connected to ground 16.

Figure 4C:
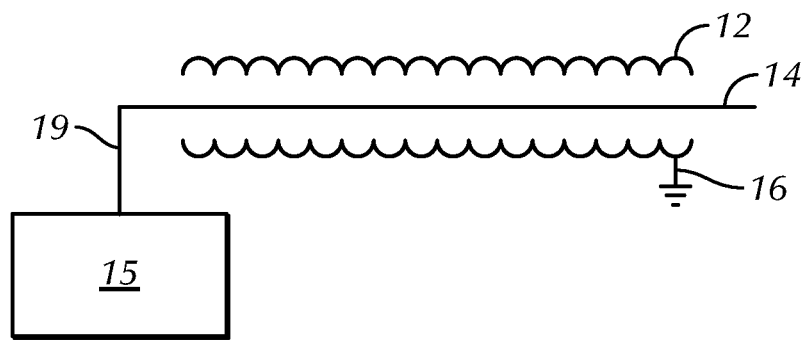

In one or more embodiments, the interior of the pipe 12 may be corrugated. FIG. 4C depicts a longitudinal view of a corrugated pipe 12, one of the possible pipe 12 structures used to increase turbulence. As in these one or more embodiments, the electrode 14 may be disposed through the center of the pipe 12 and may be connected to a power source 15. Additionally, the pipe 12 may be connected to ground 16.

In one or more embodiments, the pipe 12 may be constructed such that a straight electrode 14 can be disposed through the center of the pipe 12 without touching the interior walls of the pipe 12. Therefore, the pipe 12 may have a straight bore of sufficient internal diameter that the electrode 14 can be disposed through this bore without touching the pipe 12 interior. This constraint would impact the design of corrugated and/or undulating pipes 12, among others.

Designing the electro-coalescer pipes 12 such that they have a straight, central bore confer several benefits. In particular, such pipe 12 designs allow for easy fabrication of a device with excellent performance. Additionally, the electrode 14 does not need to be disposed through the center of this central bore, but instead could be offset from the exact center of the central bore.

The pipe 12 and/or the electrode 14 may be inclined relative to horizontal, in one or more embodiments. In one or more such embodiments, the electrode 14 may be disposed through the bore of the pipe 12, but may be closer to one side of the pipe 12, e.g. the top, towards the inlet than the outlet.

Alternatively, in one or more embodiments, more than one electrode 14 may be disposed through a single pipe 12. One or more embodiments may have an electrode 14 disposed through the upstream portion of the pipe 12 and a second electrode 14 disposed through the downstream portion of the pipe 12, with a gap between the two electrodes. The upstream electrode 14 and downstream electrode 14 may be differently insulated and may be connected to different power sources 15. In one or more embodiments, the upstream electrode 14 may have an electrically insulating sleeve 17 and may be connected to a high-frequency AC power source 15, while the downstream electrode may lack an insulating sleeve 17 and may be connected to a DC power source 15.

Various design factors have different weights for the interior and the exterior cross-sections of the pipe 12. The exterior shape may result from design decisions that reflect manufacturing, handling, space, and other concerns. Separately, the interior shape may be designed to optimize the electro-coalescence process.

The external shape may reflect the internal structure of the pipe 12. For instance, the exterior structure could vaguely indicate the internal structure but not have the same detailed features.

Figure 4D:
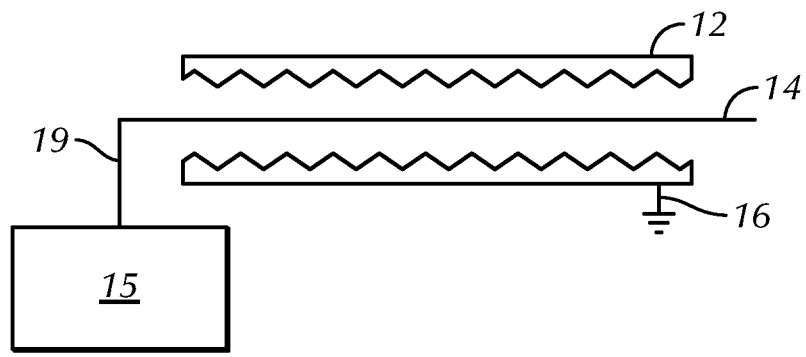

Alternatively, the exterior shape of the pipe 12 may be completely dissimilar from the interior shape. In this case, the outside cross-section may be regular, as in one or more embodiments where the outside cross-section is a hexagon or a circle. But, internally, the pipe 12 can be tortuous or corrugated. FIG. 4D depicts a longitudinal view of a pipe 12 where the exterior and the interior of the pipe are dissimilar. Here, the exterior of the pipe 12 is smooth while the interior has a jagged structure to induce turbulence. In this image, the electrode 14 is disposed through the center of the pipe 12 and is connected to a power source 15. Additionally, the pipe 12 is connected to ground 16. But, in a situation such as this, the electrode 14 does not need to be disposed through the center of the pipe 12, but instead could be offset from the exact center.

Similarly, the exterior and the interior of the pipe 12 could be two different shapes, for example, hexagonal and circular, respectively.

Fundamentally, electro-coalescence requires a sufficiently high electric field to pass through the fluid of interest to induce coalescence. Estimations and experience of electro-coalescence in liquid-liquid systems show that the necessary value of electric field to produce coalescence in a liquid-gas system should be in the range $10^3$-$10^4$ V/cm. Typical values of electric fields that cause auto electron emission (i.e., the only charging mechanism for the droplets by electrostatic fields) are greater than about $10^7$ V/cm, so the above electric field will not produce any charging of the droplets. There are a multitude of ways to design an electro-coalescer 10 that delivers a sufficiently high electric field through a fluid.

In cases where the process fluid of the electro-coalescer 10 is primarily gaseous, it is possible to generate an electric field across a gas because gases are good insulators. In such an electric field, charged particles are attracted to the ground 16. Uncharged particles will be polarized and, due to dipole-dipole interaction, an attractive force between them will appear but they will remain unattracted to the electrode 14. The forces generated by the electric field in the electro-coalescer 10 is too weak to ionize the free particles.

In the case of a liquid process fluid, the electric field generated by the electrode 14 polarizes the liquid droplets in the process stream to locally neutralize the electrostatic field. The polarized droplets are not attracted by the homogeneous field to the ground 16 because the net charge of the droplet is zero. The polarized droplets do feel the gradient of the electric field of other droplets at short range. In this manner, the droplets are attracted to one another.

If the internal diameter of the pipe 12 (and accordingly the distance between the interior of the pipe 12 and the exterior of the electrode 14) is too large relative to the applied voltage, the electric field between the electrode 14 and the pipe 12 either will be too weak or will be too energy inefficient, resulting in poor performance of the electro-coalescer. The maximum distance between the exterior of the electrode 14 and the interior of the pipe 12 for achieving good electro-coalescence performance may depend on a variety of factors, such as: the fluid composition and properties; the applied voltage; the electrode 14 composition and geometry; the pipe 12 composition and geometry; and the presence of other materials between the electrode 14 and pipe 12.

Conversely, if the interior of the pipe 12 and the exterior of the electrode 14 are too close, fouling or clogging may occur in the cell; water-droplet chains may be formed resulting in short-circuit between the pipe 12 and the electrode 14; power consumption may drastically increase; coalescence performance may vanish; re-emulsification may take place; or other adverse events can occur. The minimum distance between the exterior of the electrode 14 and the interior of the pipe 12 may depend on a variety of factors, such as: the fluid composition and properties; the applied voltage; the electrode 14 composition and geometry; the pipe 12 composition and geometry; and the presence of other materials between the electrode 14 and pipe 12.

The incorporation of a sleeve 17 around the electrode 14 in one or more embodiments can help inhibit the diminishing of the electric field in the fluid; short-circuiting between the electrode 14 and the pipe 12 via the fluid; reduced or vanished coalescence performance; increased power consumption; etc., and/or can decrease the minimum distance between the interior of the pipe 12 and the exterior of the electrode 14. The incorporation of the sleeve 17 also enables the electro-coalescer to resolve emulsions containing large concentrations of the dispersed phase and/or emulsions containing a continuous-phase with relatively high electrical conductivity. Processing fluids such as these requires the insulated electrode(s) 14 be energized by a power source 15 capable of creating an intense electric field able to penetrate through the volume of fluid passing though the cell. One such power source 15 is a high-voltage, high-frequency, alternating-current resonant circuit with a power source and control system arrangement such as the one or more embodiments described in this document.

If the length of the pipe 12 is very short, the electric field in the fluid will be lost. Additionally, in order to increase the Reynolds number into the transitional regime, it is necessary to increase the flow velocity. A higher flow velocity means a shorter residence time for a given pipe 12 length. Therefore increasing the pipe 12 length increases the residence time, allowing for more collisions between the droplets.

In some applications, long pipes 12 may be used to increase the residence time or to lower the required field strength. In other applications, shorter pipes 12 may provide sufficient coalescence for a particular application while minimizing process time.

The pipes 12 in a gas electro-coalescer 10 may have a smaller diameter than in a liquid electro-coalescer 10.

One or more embodiments may have a length to internal diameter ratio of the pipe 12 up to about 50:1.

Further, one or more additional embodiments may have a length to internal diameter ratio of the pipe 12 of between 3:1 and 30:1 (i.e., greater than about 3:1 and less than about 30:1).

Figure 5:
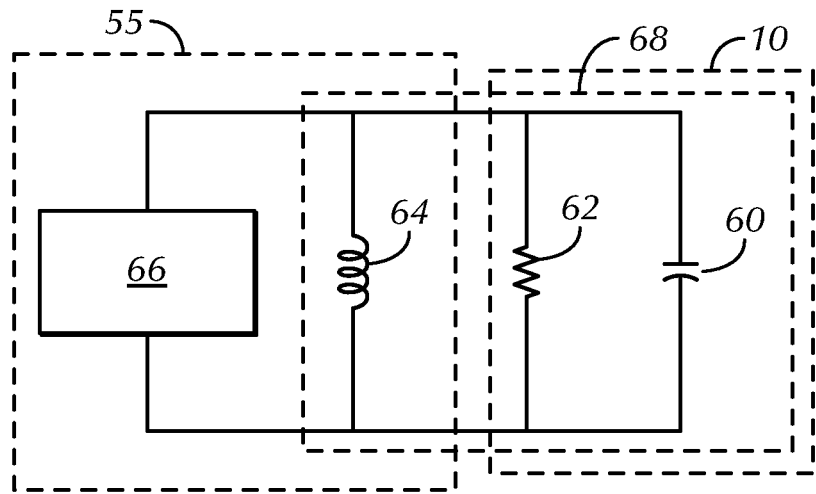
FIG. 5 is a simplified block diagram of a control circuit of the electro-coalescer in FIG. 1 and FIG. 2.

Referring to FIG. 5, a simplified block diagram of a control circuit 55 of the electro-coalescer 10 in one or more embodiments is provided. The properties of the process fluid affect the net electrical characteristics of the electro-coalescer 10. Hence, the electro-coalescer 10 is modeled as a capacitor 60 in parallel with a resistor 62 representing the net capacitance and resistance defined by the arrangement of the electrode 14 and interior of the pipe 12, and the fluid passing between them. The control circuit 55 includes an inductor 64 and an alternating current (AC) generator 66. Collectively, the inductor 64 along with the capacitor 60 and resistor 62 that model the electro-coalescer 10 and fluid define a resonant circuit 68. In general, the AC generator 66 maintains its output frequency at the resonant frequency of this resonant circuit 68 to minimize the current necessary to drive the electro-coalescer 10. The AC generator 66 generates a variable frequency sinusoidal waveform that is applied to the electrode 14 to foster coalescence in the fluid. In general, more conductive emulsions may require higher frequencies of the applied voltage.

Figure 6:
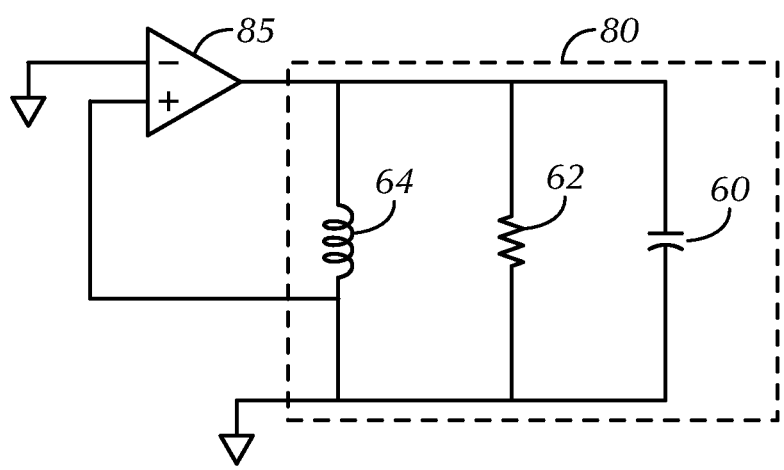
FIG. 6 is a simplified diagram of a positive loop that may be employed in an AC generator in the control circuit of FIG. 5.

In one or more embodiments, the AC generator 66 may be an auto-generator circuit. As known to those of ordinary skill in the art, an auto-generator is generally an amplifier with a large amplification that has an exit connected to the entrance, which is commonly referred to as a positive loop. The positive loop includes a resonant circuit that defines the frequency of oscillation. In this embodiment, the resonant circuit 68 may be coupled to the positive loop of the AC generator 66, thereby providing for passive frequency adjustment of the AC generator 66 corresponding to the resonant frequency of the resonant circuit 68. FIG. 6 illustrates how the resonant circuit 68 may be incorporated into the positive loop of the AC generator 66 through a comparator 85. Because of the positive feedback, the AC generator 66 operates at the resonant frequency of the resonant circuit 68. Because the inductor 64 is fixed, the frequency adjusts according to the varying properties of the process fluid and the resulting capacitance of the electro-coalescer 10. As the properties of the fluid change over time, the AC generator 66 automatically maintains its output at the varying resonant frequency, thereby minimizing the current requirements required for driving the electro-coalescer 10.

Figure 7:
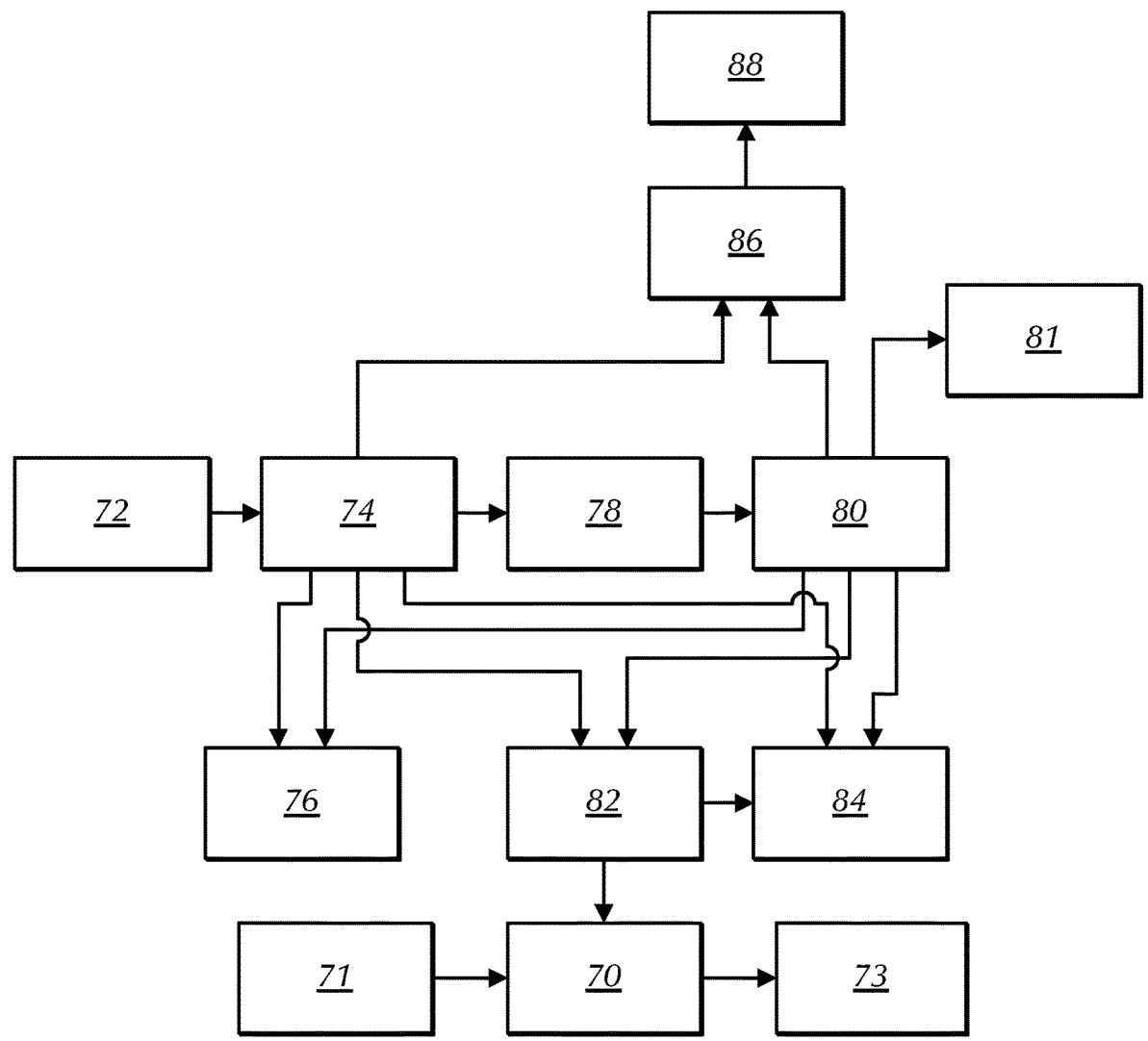
FIG. 7 is a simplified block diagram of an auto-generator circuit that may be employed in the control circuit of FIGS. 5 and 6.

FIG. 7 is a simplified block diagram of the auto-generator circuit that may be employed for the AC generator 66. This auto-generator circuit includes a power unit 70 that receives an AC input voltage 71 (e.g., 220V, 50 Hz) and generates DC output voltages 73 (e.g., +300V, +50V, +12V, +9V, etc.) for powering the other units of the circuit. A driving generator 72 produces driving pulses at double frequency. A signal conditioner 74 produces signals for a frequency phase adjustment unit 76 and for switching the gates of transistors in a power amplifier 78. The power amplifier 78 is a push-pull amplifier. The frequency phase adjustment unit 76 compares the phases of the driving generator 72 and an output signal and adjusts the frequency of the driving generator 72 to achieve resonance with varying load characteristics. A resonance transformer 80 forms a sinusoidal output signal 81 with an amplitude up to 3 kV, for example, for powering the electro-coalescer 10. A positive feedback path exists between the resonance transformer 80 and the frequency phase adjustment unit 76.

A control unit 82 controls the frequency and amplitude of the output signal, and in response to a condition that exceeds defined limits, sets the AC generator 66 into a safe mode (i.e., low power). An indicator unit 84 indicates the parameters of the output signal. An interface 86 may be provided for connecting the AC generator 66 to an external computing device 88, such as a personal computer, controller, or some other general purpose or special purpose computing device to track device parameters such as frequency, amplitude, and consumed power or to allow operator intervention or system configuration.

In one or more embodiments, the electrodes 14 in an electro-coalescer 10 may be controlled separately. This configuration creates an electro-coalescer 10 where not all electrodes 14 are necessarily electrified when the unit is on. This system would allow a continuous fluid phase to pass through any un-electrified pipes 12 without undergoing electro-coalescence.

Figure 8:
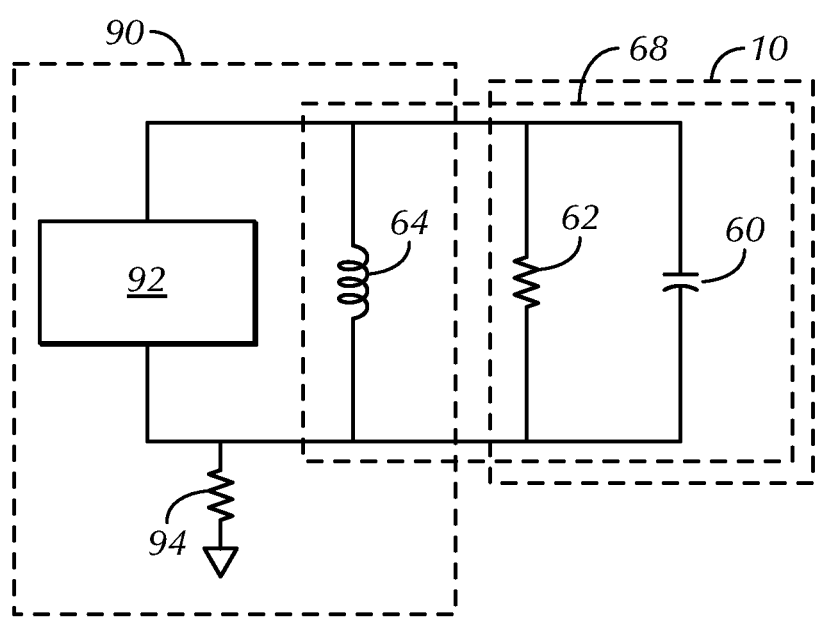
FIG. 8 is a simplified block diagram of an alternative embodiment of a control circuit of the electro-coalescer of FIG. 1.

FIG. 8 illustrates an alternate embodiment of a control circuit 90, where an AC generator 92 is a signal generator that outputs a configurable frequency signal. For example, the AC generator 92 may be a voltage controlled oscillator. The voltage at a resistor 94 represents a measure of the output current of the control circuit 90 for driving the electro-coalescer 10. The AC generator 92 measures the output current and automatically adjusts its output frequency to minimize the value of the measured voltage, which corresponds to a resonance condition. Hence, the AC generator 92 actively adjusts its output frequency based on the measured drive current to obtain the resonant frequency of the resonant circuit 68.

Generally, the frequency of the oscillation is above 1 kHz due to the relaxation time associated with most types of crude oil, which is in the range of 0.02-0.003 seconds. In the illustrated embodiment, it is assumed that the capacitance is about 0.1 µF and the nominal frequency is about 10 kHz, which provides for an inductance of about 3 mH. Of course, the inductor 64 may be sized differently based on different assumptions about the process fluid and geometry of the electro-coalescer 10.

Monitoring the frequency of the control circuit 55, 90 provides information regarding the capacitance of the electro-coalescer 10. This information can determine properties of the process fluid, such as the water cut. The power consumption of the electro-coalescer 10 is defined by the resistance of the process fluid and that resistance can provide information regarding the salinity of the process fluid. Hence, by measuring the capacitance and resistance, the process fluid can be frequently characterized and monitored. Together, the electrical resistance and the value of the water cut characterize the quality of a water-in-oil fluid being processed.

In contrast to electro-coalescence of water in water-in-oil systems, the conductivity of gases is far less than the conductivity of crude oils. This circumstance makes it possible, in one or more embodiments, to use a DC voltage power source to create an electric field in the gas media. Alternatively, in some applications, the electro-coalescer 10 may be employed in a gas application where a controlled resonance AC power source may be used.

Lowering the voltage may decrease the overall power requirements of the electro-coalescer 10. Also, the increased turbulence and resulting increased droplet-droplet contact frequency due to the geometry of the pipes 12 may lower the electric field and/or voltage required for efficient separation.

Not all embodiments will require applying a high voltage to the electrode 14. High voltage is here to be understood as typically above 1 kV.

One or more embodiments of the power source 15 may use alternating current, high-voltage, and high-frequency to generate an intense electric field to polarize and rapidly coalesce a dispersed phase in a dominant phase, which in one or more embodiments may be dispersed water droplets in an oil-continuous phase.

During operation, the strength of the electric field may be adjusted to reach an optimum value where water droplet-droplet coalescence may be maximized while secondary droplet formation may be prevented or minimized.

A connecting device of the type described here may be dimensioned to handle voltages up to and exceeding 100 kV.

One or more embodiments of the electro-coalescer 10 may serve to separate oil and an aqueous phase, where the aqueous phase is optionally salt water, brackish water, or wash water, and may contain dissolved salts. Wash water is here to be understood as water injected upstream of the electro-coalescer to absolve a portion of the salt present in the incoming fluid stream.

In one or more embodiments, an oil may be the dominant phase and an aqueous phase (which may optionally include dissolved salts) may be the dispersed phase.

In one or more alternative embodiments, the aqueous phase (which may optionally include dissolved salts) may be the dominant phase and the oil may be the dispersed phase.

In one or more embodiments, the fluid stream may derive from downhole in an oil-producing well. Such a fluid stream may comprise petroleum oil, an aqueous phase (such as water from natural sources, drilling fluid, or injection well deployment), natural gas, and/or solids (such as mud, sand, and rock). Additionally, the aqueous phase may be optionally salt water, brackish water, or wash water, and may contain dissolved salts.

The electro-coalescer 10, in one or more embodiments, may be part of a larger separation system 100 for separating multiple components out of the fluid stream. That system may include additional components, such as a flash evaporator 130, a solids separator 140, and/or a fluids separator 110.

Figure 9A:
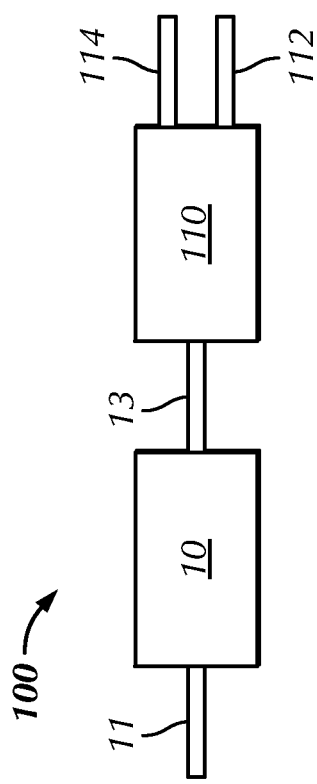
FIGS. 9A-B are simplified diagrams of separation systems that incorporate additional components along with an electro-coalescer as depicted in FIGS. 1 and 2A-B.

FIG. 9A is a simplified diagram of a potential separation system 100 that incorporates both an electro-coalescer 10 and a fluids separator 110. In the one or more embodiments depicted here, the process fluid flows via the inlet 11 into the electro-coalescer 10 where it undergoes electro-coalescence to increase the average droplet size of the dispersed phases in the dominant phase to form the larger-droplet fluid. The larger-droplet fluid then flows via the outlet 13 into a fluids separator 110. The fluids separator 110 separates the larger-droplet fluid into the dispersed phase and the dominant phase, and separately discharges the dispersed phase via the dispersed phase outlet 112 and the dominant phase via the dominant phase outlet 114.

Figure 9B:
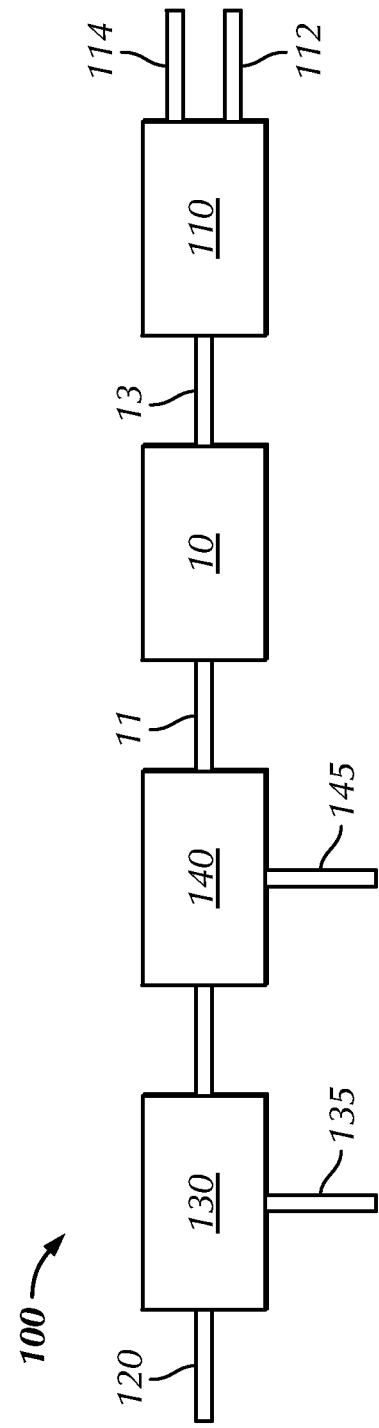

FIG. 9B is a simplified diagram of a potential separation system 100 that incorporates a flash evaporator 130, a solids separator 140, an electro-coalescer 10, and a fluids separator 110. In the one or more embodiments depicted here, the process fluid first flows via the inlet piping 120 into the flash evaporator 130, where gas is separated from the fluid. The flash evaporator 130 performs flash evaporation to produce a reduced-gas fluid. The gas is discharged via a gas outlet 135 and the reduced-gas fluid is fed out the outlet of the flash evaporator 130 into the solids separator 140. The solids separator 140 then separates the solids from the reduced-gas fluid to form a reduced-gas and reduced-solid fluid. The solids are discharged via a solid outlet 145 and the reduced-gas and reduced-solid fluid enters the electro-coalescer 10 via the inlet 11. Within the electro-coalescer 10, the reduced-gas and reduced-solid fluid undergoes electro-coalescence to increase the average droplet size of the dispersed phase in the dominant phase to form the larger-droplet fluid. The larger-droplet fluid then flows via the outlet 13 into a fluids separator 110. The fluids separator 110 separates the larger-droplet fluid into the dispersed phase and the dominant phase, and separately discharges the dispersed phase via the dispersed phase outlet 112 and the dominant phase via the dominant phase outlet 114.

When applied to the purification of oil from downhole, for example, a number of steps can be applied that each separate and/or discharge a constituent phase. Those additional steps may be performed upstream or downstream of the electro-coalescer 10 according to embodiments herein.

In one or more embodiments, the separation system 100 may include a flash evaporator 130. First, a process fluid may enter the flash evaporator 130. The flash evaporator 130 then may perform flash evaporation, which separates gas from the fluid stream to create a reduced-gas fluid. The gas may then be discharged via a gas outlet 135 and the reduced-gas fluid may exit via an outlet of the flash evaporator 130 so it may be further processed.

In one or more embodiments, the flash evaporator 130 may be upstream of the electro-coalescer 10.

In one or more embodiments, the separation system 100 may include a solids separator 140. First, a process fluid may enter the solids separator 140. The solids separator 140 may then perform solids separation, which separates solids from the fluid stream to create a reduced-solid fluid. The solids may then be discharged via a solids outlet 145 and the reduced-solid fluid stream may exit via an outlet of the solids separator 140 so it may be further processed.

In one or more embodiments, the solids separator 140 may be upstream of the electro-coalescer 10.

In one or more embodiments, the flash evaporator 130 and the solids separator 140 may be combined to form a combined flash evaporator/solids separator unit.

In one or more embodiments, the separation system 100 may include a fluids separator 110. First, fluid may enter the fluids separator 110. The fluids separator 110 may then perform fluids separation, which separates the two or more constituent phases of the fluid stream to create a dominant phase and one or more dispersed phases. Once separated, the dispersed phase(s) can be discharged via one or more dispersed phase outlets 112 and the dominant phase may be discharged via a dominant phase outlet 114.

In one or more embodiments, oil and an aqueous phase may be separated in the fluids separator 110 and discharged separately; the aqueous phase via a water outlet and the oil via an oil outlet. In one or more embodiments, the fluids separator 110 may be downstream of the electro-coalescer 10.

In one or more embodiments, the process fluid stream may encounter the flash evaporator 130, the solids separator 140, the electro-coalescer 10, and the fluids separator 110.

In one or more embodiments, the process fluid stream may encounter the flash evaporator 130, the solids separator 140, the electro-coalescer 10, and the fluids separator 110, in that order.

In one or more embodiments, removing solids via a solids separator 140 or some other method upstream of the inlet may help reduce erosion of the pipes 12 in the electro-coalescer 10.

Larger droplets, such as those in the fluid after electro-coalescence, settle faster in a fluids separator 110. Therefore, the total dwell time in the fluids separator 110 may be reduced and/or the size of the fluids separator 110 may be reduced. Decreased separation time and/or decreased fluids separator 110 size may result in reduced initial capital and/or operating costs for the entire separation system 100.

Increasing the average droplet size of the dispersed phase at the outlet 13 also allows for a potential reduction in the size of the fluids separator 110. A smaller fluids separator 110 may permit the entire separation system 100 to be deployed close to the generation of the initial fluid stream in a location where space is limited.

The application of the present subject matter is not limited to any particular embodiment of the fluids separator 110. Exemplary fluids separator 110 types include horizontal separators, gravity separators, enhanced gravity separators (e.g., cyclone based separation technology), cyclonic separators, and centrifugal separators.

In some embodiments, the electro-coalescer 10 and the fluids separator 110 may be integrated into a single unit. This combined unit may be a pressure vessel, in one or more embodiments.

In one or more embodiments, the flash evaporator 130, electro-coalescer 10, and fluids separator 110 may be combined to form a combined unit. This combined unit may be a single pressure vessel, in one or more embodiments. The solids separator 140 may be a separate unit that may be located upstream or downstream of the combined unit, or elsewhere in the production system.

In one or more embodiments, the flash evaporator 130, electro-coalescer 10, solids separator 140, and the fluids separator 110 may be combined to form a combined unit. This combined unit may be housed in a single pressure vessel, in one or more embodiments.

The use of an electrostatic force to coalesce liquid droplets in a fluid flow allows more efficient downstream removal of the droplets, thereby reducing the demands on the removal equipment resulting in higher throughput, enhance reliability, and improved performance.

In new systems, adding an electro-coalescer may allow for a significant reduction in size and weight of the downstream separation systems, resulting in decreased capital costs.

A commercially-available compact electrostatic coalescer may have a weight that is two to four times higher than the electro-coalescer 10 of one or more embodiments of this disclosure. Incorporating the electro-coalescer 10 of this disclosure may reduce the size and/or weight of the electro-coalescer 10 and/or the entire separation system. Therefore, in one or more embodiments, separation of two phases, such as oil and water, could be undertaken at a location with significant space and/or weight limitations, such as boat, oil derrick, subsea, remote, Arctic, or marginal field locations.

Furthermore, separating two phases, such as separating oil from waste water, at such a remote location could also reduce the amount of the dispersed phase being unnecessarily transported.

Less energy is required to pump more dehydrated oil due to decreased viscosity. Accordingly, deployment of the electro-coalescer 10 can decrease the energy required to transport oil.

The electro-coalescer 10 may also include a fluid/chemical injection system (not shown). Such a system may comprise an arrangement of spray nozzles, where each spray nozzle feeds the injection fluid/chemical at the inlet to each cell of the electro-coalescer 10. The injection fluid/chemical can have several functions, such as a chemical demulsifier, anti-fouling, fresh-water injection (e.g. for desalting applications), steam-injection for cleaning purposes, anti-corrosive fluid, etc.

Utilization of an electro-coalescer 10 in conjunction with a chemical and/or heat treatment separation system can reducing chemical deemulsifier and/or energy consumption, resulting in decreased costs.

One or more embodiments of the pipes 12 may also incorporate high surface-area coalescence devices, such as honeycomb meshes or conventional meshes.

One or more embodiments of the electro-coalescer 10 may only have the capability to treat influent fluids by increasing the drop size of the secondary constituent. Therefore, the overall composition of the influent and the effluent may remain the same. One or more embodiment could go further and separate one or more secondary constituents. After separation, those constituents could then be removed from the flow via an additional outlet(s).

One or more embodiments of this process would be the coalescence of sufficient water from oil that the water falls to the bottom of a pipe 12, where it becomes part of the electrical ground 16. Eventually, the water could be diverted from the main effluent flow via a water outlet to be disposed of. This scenario may utilize a pipe 12 with an elliptical cross-section through which the electrode 14 may be disposed at a location that may be offset from the center of the cross-section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. An electro-coalescer, comprising:
a fluid inlet;
a fluid outlet;
a power source; and
one or more pipes fluidly connecting the inlet and the outlet, each pipe having an electrode disposed therethrough;
wherein
each electrode is coupled to the power source,
each pipe is configured to connect to an electrical ground, whereby an electric field is generated between the electrode and the pipe through which it is disposed, and an internal surface of each of the one or more pipes is configured to induce turbulence in a fluid flowing through each of the one or more pipes, wherein the internal surface is corrugated or has a twist structure.

2. The electro-coalescer as claimed in claim 1, wherein the power source comprises a direct current power source, wherein the direct current power source supplies a direct current that is optionally continuous or pulsed.

3. The electro-coalescer as claimed in claim 1, further comprising:

a controller, comprising:
an inductor coupled in parallel with each electrode, the inductor and electrode defining a resonant circuit; and
a signal generator coupled to the power source and each electrode and operable to apply an alternating current signal to the electrode at a frequency corresponding to a resonant frequency of the resonant circuit in the presence of the fluid.

4. The electro-coalescer as claimed in claim 1, wherein each of
the one or more pipes has a length to internal diameter ratio of up to about 50:1.

5. The electro-coalescer as claimed in claim 1, wherein at least one of the electrodes may be selectively turned off, such that a continuous phase may be allowed passage through the corresponding pipe.

6. The electro-coalescer as claimed in claim 1, wherein each of the one or more pipes is surrounded by a casing, and
between multiple pipes are one or more tubesheets.

7. The electro-coalescer as claimed in claim 1, wherein each electrode consists of a conductor surrounded by an electrically insulating sleeve.

8. The electro-coalescer as claimed in claim 1, wherein each electrode is made of an electrically conductive material, and
each of the one or more pipes is made of an electrically conductive material,
wherein each electrode optionally takes the shape of a rod or a tube.

9. The electro-coalescer as claimed in claim 1, wherein each electrode is in contact with the fluid and not in electrical contact with the corresponding pipe.

10. The electro-coalescer as claimed in claim 1, wherein each electrode is substantially straight.

11. A method of separating two fluid phases, comprising:
providing a flow of a process fluid comprising two or more phases, including a dominant phase and a dispersed phase, to an electro-coalescer as claimed in claim 1;
electrically grounding the one or more pipe(s);
applying a voltage to one or more of the electrode(s) of the electro-coalescer;
generating an electric field between the electrode(s) and the pipe(s);
passing the process fluid through the electric field;
wherein
the electric field induces electrocoalescence of droplets of the dispersed phase within the process fluid,
the internal surface of the pipe(s) induces turbulence and increases an interaction frequency between droplets of the dispersed phase, and
the droplets of the dispersed phase coalesce and
recovering a larger-droplet fluid, wherein an average droplet size of the dispersed phase at the outlet is increased as compared to an average droplet size of the dispersed phase at the inlet.

12. The method of separating two fluid phases as claimed in claim 11, further comprising
generating the electric field using a direct current signal applied to each electrode, wherein the direct current signal is optionally continuous or pulsed.

13. The method of separating two fluid phases as claimed in claim 11, further comprising:
providing an inductor coupled in parallel with each electrode, whereby the inductor, each electrode, each pipe, and the process fluid define a resonant circuit; and
applying an alternating current signal to each electrode at a frequency corresponding to a resonant frequency of the resonant circuit in the presence of the process fluid.

14. The method of separating two fluid phases as claimed in claim 13, wherein applying the alternating current signal comprises:
sensing a current of the alternating current signal; and
changing the frequency to minimize the sensed current.

15. The method of separating two fluid phases as claimed in claim 11, wherein the turbulence induced by the internal surface of each pipe is sufficient to contribute to an increase in the average droplet size of the dispersed phase without causing significant redispersion of the dispersed phase.

16. The method of separating two fluid phases as claimed in claim 11, wherein
the average droplet size of the dispersed phase at the outlet is at least 50% larger than the average droplet size of the dispersed phase at the inlet.

17. The method of separating two fluid phases as claimed in claim 11, wherein
the dominant phase is an oil and the dispersed phase is an aqueous phase that can optionally contain dissolved salts.

18. The method of separating two fluid phases as claimed in claim 11, wherein
the dispersed phase is an oil and the dominant phase is an aqueous phase that can optionally contain dissolved salts.

19. The method of separating two fluid phases as claimed in claim 11, further comprising
feeding the larger-droplet fluid recovered from the outlet of the electro-coalescer into a fluids separator downstream;
performing fluids separation on the larger-droplet fluid to separate the dispersed phase and the dominant phase; and
separately discharging the dispersed phase via a dispersed phase outlet and the dominant phase via a dominant phase outlet.

20. The method of separating two fluid phases as claimed in claim 11, further comprising
feeding an inlet fluid into a solids separator that is upstream of the electro-coalescer;
performing solids separation on the inlet fluid to separate solids, creating a reduced-solid fluid;
discharging the solids via a solids outlet and the reduced-solid fluid via an outlet of the solids separator; and
feeding the reduced-solid fluid into the inlet of the electro-coalescer.

21. The method of separating two fluid phases as claimed in claim 11, further comprising feeding an inlet fluid into a flash evaporator that is upstream of the electro-coalescer;

performing flash evaporation on the inlet fluid to separate a gas, creating a reduced-gas fluid;

discharging the gas via a gas outlet and the reduced-gas fluid via an outlet of the flash evaporator; and feeding the reduced-gas fluid into the inlet of the electro-coalescer.

22. A method for separating a dispersed phase from a dominant phase in a fluid comprising oil and an aqueous phase, the method comprising:

supplying the inlet fluid to at least one of a flash evaporator or a solids separator to produce a fluid with reduced gas and/or reduced solids;

feeding the inlet fluid or a reduced-solid fluid into the flash evaporator, performing flash evaporation to separate natural gas from the reduced-solid fluid or the inlet fluid, discharging the natural gas via a gas outlet, and creating a reduced-gas fluid that is output via an outlet of the flash evaporator;

feeding the inlet fluid or the reduced-gas fluid into the solids separator, performing solids separation to separate solids from the reduced-gas fluid or the inlet fluid, discharging the solids via a solids outlet, and creating the reduced-solid fluid that is output via an outlet of the solids separator;

feeding the reduced-gas and/or the reduced-solid fluid to an electro-coalescer as claimed in claim 1 and performing electrocoalescence to increase average droplet size of the dispersed phase in the dominant phase in the reduced-gas and/or the reduced-solid fluid, and creating a larger-droplet fluid that is output via an outlet of the electro-coalescer; and feeding the larger-droplet fluid into a fluids separator, performing fluids separation on the larger-droplet fluid to separate the aqueous phase and the oil, and separately discharging the aqueous phase via a water outlet and the oil via an oil outlet.

23. A separation system for separating one or more dispersed phases from a dominant phase in an inlet fluid, the system comprising:

a flash evaporator that separates a gas from the inlet fluid and/or a reduced-solid fluid, creates a reduced-gas fluid, discharges the gas via a gas outlet, and outputs the reduced-gas fluid via an outlet of the flash evaporator;

a solids separator that separates solids from the inlet fluid and/or the reduced-gas fluid, creates the reduced-solid fluid, discharges the solids via a solids outlet, and discharges a reduced-gas and/or reduced-solids fluid via an outlet of the solids separator;

an electro-coalescer as claimed in claim 1 that performs electrocoalescence to increase average droplet size of the dispersed phases in the dominant phase within the reduced-gas and/or reduced-solids fluid producing a larger-droplet fluid, and outputs the larger-droplet fluid via an outlet of the electro-coalescer; and a fluids separator that separates the larger-droplet fluid into the dispersed phases and the dominant phase, and separately discharges the dispersed phases via one or more dispersed phase outlets and the dominant phase via a dominant phase outlet.

24. An electro-coalescer, comprising:

a fluid inlet;

a fluid outlet;

a power source;

a pipe fluidly connecting the inlet and the outlet; and an electrode extending through a bore of the pipe; wherein the electrode is coupled to the power source, whereby an electric field is generated between the electrode and the pipe, an internal surface of the pipe is configured to induce turbulence in a fluid flowing through the pipes, wherein the electrode extends along an axis parallel with the bore of the pipe without touching the internal surface of the pipe, and wherein the internal surface of the pipe is corrugated or has a twist structure.

\* \* \* \* \*